Patented Oct. 30, 1934

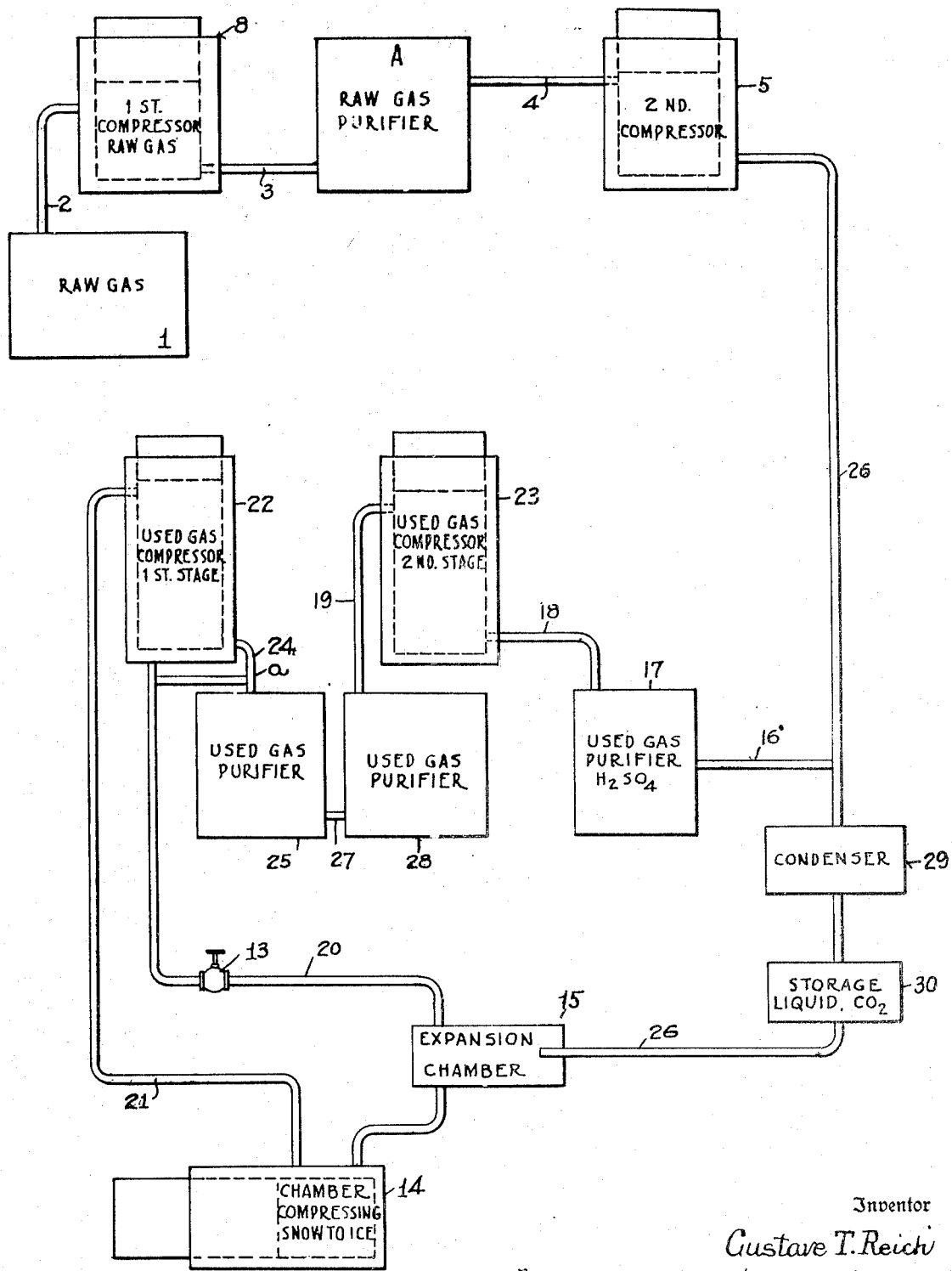

1,978,508

UNITED STATES PATENT OFFICE 1,978,508

PROCESS OF REPURIFYING CARBON DIOXIDE GAS

Gustave T. Reich, Philadelphia, Pa.

Application April 22, 1932, Serial No. 606,858

17 Claims. (Cl. 62—121)

The purification of impure $CO_2$, to remove impurities that would affect unfavorably the products into which it enters has been practiced for some time. Processes of purification have been applied to the raw carbon dioxide that was to be used subsequently in the formation of solid carbon dioxide. In the production of solid carbon dioxide, the gas is cooled, liquefied, and may be cooled again, and then allowed to expand suddenly, reducing a portion into solid carbon dioxide, while the other part changes into a gaseous state. This gas being at a low temperature may be re-compressed and changed into the liquid state readily, and used over again to produce solid carbon dioxide. Among the difficulties experienced in carrying out this cycle was the accumulation of impurities of many kinds. Some of them were remnants of impurities that were in the gas before it was purified originally, the proportion of which to the rest of the gas being increased through elimination of solid carbon dioxide. Some impurities were introduced in the compression.

Many of these impurities were particularly objectionable when the gas is used to produce solid carbon dioxide. Water is objectionable in this manufacture, especially as it freezes at a higher temperature than carbon dioxide, clogging the valves of the apparatus. If the gas is repassed without purification, the water becomes frozen. Other more or less malodorous adulterants also are objectionable.

In my process described hereinafter, and illustrated by the accompanying drawing, I describe and show a continuous order of steps with an apparatus by which they may be advantageously and practically performed. The gaseous carbon dioxide that remains after the expansion, may be re-compressed and re-used without interfering with the compression of the raw gas and with the elimination of impurities, and it is arranged so that my process may be performed continuously and the pressure on the $CO_2$ gas in chamber in which the carbon dioxide snow is compressed into ice may be maintained to a substantial extent after it is drawn off from it, and the $CO_2$ gas from it may be passed under this pressure to the secondary compression system.

The portion of the $CO_2$ that is not subsequently to be used in forming the solid $CO_2$ is gaseous, but held still under pressure which may be as high as 399 lbs. The portion of $CO_2$ that subsequently is to be used in forming the solid $CO_2$ is in a liquid form. Then the pressure on this is further reduced, and it is evaporated, in part, forming the remainder of the liquid into $CO_2$ snow, which may be mechanically compressed into a cake of $CO_2$.

In this chamber the $CO_2$ that had been purified, and which, when the secondary purification system is not active, comes from the primary purifying system, and when both are active may come from both primary and secondary purifying systems, has its temperature greatly lowered by expansion. It is still retained under pressure, which may be about 399 lbs. When reduced to this pressure, a volume of liquid $CO_2$ is formed and a volume of $CO_2$ that is gaseous and still under substantial pressure (the optimum is about 399 lbs.) is positioned above it. This latter may be led off into an element in the secondary purification system where the gas being purified is substantially under this same pressure.

The liquid $CO_2$ that flows into a snow chamber where the pressure is still further reduced, and a snow collects and is compressed into ice and the gaseous $CO_2$ now under small or no compression is drawn into the first compressor of the secondary compression system. The secondary purification and compression system comprises a series of compressors (stage compressors), with intermediate purification elements, which increases the compression and purifies the $CO_2$ gas, and finally this charges it into a gas main leading toward the portion of the apparatus where the gas is utilized for the production of the $CO_2$ ice. This gas main contains gas from the primary compressor, and under high compression and the gas discharged into it from the secondary compression and purification system should be at substantially the same compression.

This system of compression into which the used $CO_2$ gas given off from the cooling chamber and the compression chamber, the chamber where the snow is formed and compressed into ice—form a battery of compressors entirely distinct from the system used for the compression and purification of the raw gas. Generally, the secondary compressors are stage compressors, and increase the compression from that on the gas given off from different elements of the ice forming system. The first stage compressor usually receives the gas given off from them that is least compressed and the $CO_2$ gas is compressed in stages until highly compressed gas is produced and is received into a main containing purified raw gas that is at substantially a like pressure. If gas passes off from the ice forming system at a higher compression (for instance, gas passing off from the cooling chamber) it is introduced at a point in the secondary system where the gas previously introduced into the secondary system is under a substantially like compression. One or more purifiers are introduced at appropriate points in the secondary system.

The drawing illustrates diagrammatically a form of device that may be used in carrying out my process.

The compression and purification of the raw gas may be carried out by many suitable devices, and the device that I have shown is to be taken as an illustration only. In it the source from which the raw gas may be drawn is marked 1. From it a line 2, leads to a first stage compressor 8, where the gas is compressed, the gas then proceeds by a line 3, to and passes through a purification system marked as a whole A, which may be that illustrated and described in my Letters Patent No. 1,519,932 then by a line 4, to a second compressor 5, whence it passes by a line 26, to a condenser 29, and liquid carbon dioxide receiver 30, and then immediately passes through other devices to the cooling chamber 15.

The above is a brief description of a form of apparatus that is not claimed as novel in itself but so far as the present application is concerned, may be considered as forming part of the apparatus required to carry out my process.

Describing now my process in conjunction with the apparatus that I use in practice and have illustrated:—20 is a gas line leading from the cooling chamber 15, for the re-compression and re-purification of the used gas. The gas line 21, leads from the solidification chamber, where the solid carbon dioxide is compressed into cake ice.

I have illustrated the line 21, as conveying the least compressed gas, but if economical, a gas under still less initial compression may be saved and re-used.

The line 21 supposing it to carry the gas under the least compression enters the primary compressor 22, of the auxiliary system, where it receives the primary compression. The compression of the gas leaving the compressor 22, may equal the compression under which the gas is that passes off from the cooling chamber 15. The gases from the compressor 22, and from the expansion chamber 15, may then be mingled. I have shown the gas passing from the compressor as passing through line 24, and that from the cooling chamber as passing through line 20, and mingling at a, whence I have shown as passing into a purifier 25. This arrangement I have found advantageous because, among other things, it permitted the control of the temperature of the gas entering the purifier 25, the gas of line 24, being hot from the compressor, and that from the cooling chamber being cold. The purifying materials do not operate satisfactorily except with a range of temperature below that of the gas ordinarily passing from the compressor, but above that from the cooling chamber. A valve 13, may be interposed, and if necessary, heated to prevent it from freezing or may be located near enough to the compressor 22 to keep it from freezing.

The illustration shows two purifying chambers 25 and 28, the partly purified gas passing through the pipe 27, and the more completely purified gas through the pipe 19, to the second compressor 23, where in the apparatus shown the compression is raised to the compression in the line 26.

The compressed carbon dioxide again may be passed through a purifier 17, and thence through the pipe 16, to the pipe 26, where it mingles with the purified raw carbon dioxide. The pipe 26 contains a valve that may be used to control the compression in the cooling chamber 15. The purifier 17 may be omitted and the gas passed directly from the compressor 23, to the pipe 26, but there is a decided advantage in a purification at the highest compression of the used carbon dioxide, especially in extraction of all water content.

The purifying mediums may be sulfuric acid or sulfuric acids and hexavalent chromium compounds, the removal of the water being accomplished readily by bringing the carbon dioxide in contact with the former.

As an example illustrating but not limiting in any way my invention, some of the temperatures and pressures at which my invented process may be operated conveniently are here detailed as an approximate guide and aid to a convenient working of my process. In such a working, the liquid $CO_2$ coming from the condenser and liquid receiver 29—30 would be under a pressure of from 1000 to 1200 lbs. per square inch, depending partly upon the temperature of the cooling water. This warm liquid under high pressure then, controlled by a valve in conductor 26, is led into cooling chamber 15 and the pressure is reduced to approximately 300 lbs. which is substantially the pressure on the gas in the second stage compressor 23 of the secondary compression and purification system. This drop in pressure on the liquid in the chamber 15 will result in the conversion of a part of the liquid into gas, the gas being removed by the suction of the second stage compressor. This evaporation will cool the remainder of the liquid $CO_2$ in the chamber 15 to, probably, about 0° F. The chilled liquid $CO_2$ is then fed into the snow chamber 14, where the pressure is maintained below the triple point pressure. Under this pressure part of the liquid goes into gas and the remainder is converted into snow. The gas in chamber 14 is carried by the conductor 21 to the first stage compressor 22 of the secondary compression and purification system and the snow is compressed into $CO_2$ ice. It is also possible to keep the $CO_2$ in a gaseous form up to the time it reaches the cooling chamber 15 and there produces $CO_2$ in liquid form.

The assemblage for re-compressing and re-purifying the used gases may vary entirely from the assemblage for treating the raw gases. The total removal of the water from the used gases especially is of great value, for its presence tends to freeze up valves, and to cause cracks in the carbon dioxide ice.

Many changes may be made in the individual steps of the process. The pressures on the gas, in the expansion chamber, or in the chamber where the snow is compressed into solid ice may be allowed to decrease, before entering the auxiliary system. Various other places in the ice making apparatus may be tapped for waste used gases, and in general no limitation is to be imposed on the claims that would limit them to less than fair construction. The apparatus shown is merely illustrative of a convenient assemblage.

I claim:—

1. A continuous process of producing solid carbon-dioxide where liquefied $CO_2$ gas is expanded to produce snow, which process comprises compressing, purifying the raw gas, recompressing and re-purifying the expanded used gas separately from the raw gas and mingling the purified used gas with the purified raw gas while the two are compressed to the same degree of compression, and liquefying and expanding the mingled gases.

2. The process as defined in claim 1 wherein the used gases are taken off at different pressures and are introduced into the additional assemblage of compressors and purifers at stages of compression corresponding to the compression of the introduced gases.

3. In a continuous process for producing solid carbon dioxide the steps of carrying off the gas from the cooling chamber and the gas from the solid carbon dioxide press by maintaining these pressures and increasing the pressure in the gas from the carbon dioxide press to substantially the pressure on the gas from the expansion chamber and continuing these gases at the higher pressure and passing them through an auxiliary compression and purification system. Mingling these gases with purified raw gas compressed to the same degree of compression as the purified used gas.

4. In a continuous process for producing solid carbon dioxide wherein mingled purified raw gas and purified used gas are liquefied and expanded for the formation of solid carbon dioxide, the steps of drawing off the used gas remaining in the cooling chamber, maintaining it at this pressure; increasing the pressure on this gas, and purifying it, while keeping it apart from the raw gas until it reaches a pressure equal to that upon the raw gas, and then commingling it with the raw gas at that higher pressure.

5. In a process for producing solid carbon dioxide wherein the used gas is purified in an auxiliary compression and purification chamber the step of subjecting the gases while passing through the said auxiliary system to intimate contact with sulfuric acid.

6. In a process for producing solid carbon dioxide wherein the gas from the cooling chamber and from the chamber where carbon dioxide snow is compressed into solid carbon dioxide ice, is re-compressed and re-purified in an auxiliary compression system the steps of conducting separately volumes of the gases from the said snow compression chamber and from the cooling chamber to the auxiliary compressor while the said volumes of gas are maintained under different pressures, increasing the pressure upon the less compressed volume of gas and mingling and purifying the combined volumes of gas and mingling the same with purified raw gas of the same degree of compression.

7. In a process for producing solid carbon dioxide wherein the used gases are re-compressed and re-purified in an auxiliary compression and purifying assemblage, the step of maintaining the pressure on the volumes of gases while being transferred to the auxiliary compression and purification assemblage.

8. In a process for producing solid carbon dioxide wherein the volumes of gas remaining in the cooling chamber are retained under pressure, comprising re-compressing these volumes of gas from this pressure to a higher pressure and while still held substantially under this pressure, further purifying the same and liquefying and expanding these gases, so re-compressed and re-purified mingled with the purified and compressed volumes of the previously unused gases.

9. A process for re-purifying and re-using the volume of carbonic acid gas remaining in the cooling chamber of a machine for producing carbon dioxide ice, comprising maintaining substantially the pressure upon the said volume of gas, and while under this pressure compressing and purifying the same separately from the previously unused gases and mingling the compressed and purified gas with volumes of previously unused gases while under a substantially like compression and re-expanding the mingled volumes of gases to form carbon dioxide ice.

10. A continuous process for producing carbon dioxide ice wherein the volumes of gases remaining after the expansion to produce the ice are re-compressed and purified separately from the previously unused gases, and mingled with the unused gas and re-used to produce carbon dioxide ice.

11. The process as defined in claim 10 with the additional step of commingling the compressed and purified previously used and previously unused compressed and purified gases while at substantially equal compression prior to their re-use for the production of carbon dioxide ice.

12. The process as defined in claim 10 wherein volumes of gases are removed at various stages of the expansion, and under different pressures and those under the lesser compression are compressed until their compression equals that of those taken off at the higher pressures.

13. The process as defined in claim 7, where the medium for purification at the highest pressure acts also as a dehydrating agent.

14. The process as defined in claim 7, in which the de-hydrating agent is cooled by the introduction of cold gas treated and maintained thereby at a temperature where the dehydrating agent will act most efficiently.

15. The process as defined in claim 10 wherein the compression of the volumes of used gas is performed by stages, with stages of purification between the stages of compression.

16. The process as defined in claim 10, wherein the used gases are re-purified by mingling them with sulphuric acid and hexavalent chromium compounds.

17. The process as defined in claim 10, with this additional step, namely, mingling the used gases with a liquid dehydrating agent.

GUSTAVE T. REICH.